Patented Mar. 2, 1948

2,437,035

UNITED STATES PATENT OFFICE

2,437,035

ETHER-ESTERS OF ORGANIC HYDROXY DIPHENYL ACETIC ACID AND PROCESS FOR MANUFACTURE OF SAME

Alexander Lang Morrison and Marianne Königstein, Welwyn Garden City, England, assignors to Hoffmann-La Roche Inc., Nutley, N. J., a corporation of New Jersey No Drawing. Application April 1, 1947, Serial No. 738,734. In Great Britain March 30, 1946

Section 1, Public Law 690, August 8, 1946

8 Claims. (Cl. 260—472)

This invention relates to ether-esters derived from organic hydroxy acids, more particularly basic ether-esters derived from organic hydroxy acids related to mandelic acid, which have valuable pharmaceutical properties, and the manufacture thereof.

It is known that basic esters of mandelic acid, basic esters of benzilic acid, basic esters of diphenyl-acetic acid and basic ethers of benzhydrol have an anti-acetyl-choline or anti-histamine action on the organism.

We have now found that certain basic ethers of basic esters of organic hydroxy acids of the following general formula:

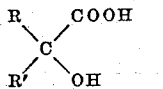   I where R is an aromatic group such as phenyl- or a substituted phenyl-group wherein said substituent is inert to the reagents used and R' may be hydrogen, alkyl, aralkyl, aryl, alkaryl or a homocyclic group, have anti-acetyl-choline or anti-histamine activity or both.

According to the present invention we provide a process for the manufacture of basic ethers having the general formula:

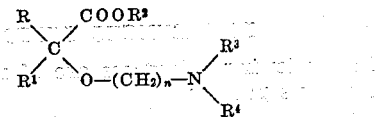   II wherein R is a phenyl or a substituted phenyl wherein the substituents are inert to the reagents used, R¹ is hydrogen, alkyl, aralkyl, aryl or a homocyclic group (such as cyclohexyl), R² is dialkylaminoalkyl, R³ and R⁴ are identical or different lower alkyl groups or combined as a poly-methylene group, and $n$ is an integer not greater than 4, in which a dialkylaminoalkyl (including piperidinoalkyl) halide is reacted with an alkali metal derivative of an ester of the general formula:

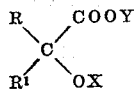   III wherein R and R¹ have the values assigned to them above, X and Y are alternatively hydrogen or a dialkylamino-alkyl (including piperidinoalkyl) group and the desired compound (II) obtained.

Thus in the case of mandelic acid or α-substituted derivatives thereof, it is found that the non-basic esters of these acids when etherified such that the hydrogen of the hydroxyl-group is replaced by a basic residue of the kind mentioned, substances are obtained which have relatively high antagonistic properties towards acetylcholine and histamine. Further, if the ester grouping is hydrolysed off and replaced by a basic residue, anti-acetyl-choline and anti-histamine properties are retained or enhanced.

In the preparation of basic esters of mandelic acids or α-substituted mandelic acids containing a basic ether grouping, it is preferable first to prepare the basic ether by reacting an alkali metal derivative of the hydroxy alkyl ester with a dialkylaminoalkyl-halide, hydrolysing off the alkyl group with an alkali-metal hydroxide and then reacting the salt so formed with a dialkylaminoalkyl-halide.

It will be understood that basic esters having basic ether groups made according to the present invention may have identical or different basic groupings.

The alkali-metal derivatives may, for instance, be prepared by saponification of the neutral esters with alkali hydroxide and the like. Generally, it is not necessary to prepare the free acid. The derivative need not be isolated, as the solution or suspension of the derivative can be effectively used in the reaction with the dialkylaminoalkyl halide.

The reaction proceeds best in the presence of an inert solvent such as benzene or its homologues.

We use dialkylaminoalkyl chlorides as the preferred dialkylaminohalides although it will be understood that the corresponding bromides and iodides may also be used and come within the scope of the invention. The preferred alkali-metal derivatives are the sodium and potassium derivatives.

The following examples show how this invention may be carried into effect.

*Example 1*

2 g. of the dimethylaminoethyl ether of ethyl benzilate were heated with a solution of 2 g. caustic potash in 2 ml. water and 25 ml. ethanol under reflux for 6 hours. The alcohol was then distilled off and the residue dissolved in water. The pH of this solution was adjusted to pH 8 by the addition of dilute hydrochloric acid and the water removed by heating under reduced pressure. The residue was dried by distillation with benzene which was then removed by distilling it off. The residue which contained the potassium salt of the dimethylaminoethyl ether of benzilic acid was then reacted with an excess of freshly prepared β-chloroethyldiethylamine in 20 cc. benzene and the mixture refluxed for 60 minutes. After cooling, the reaction product is shaken with water and the benzene layer separated, and extracted with dilute hydrochloric acid. On making this acid extract alkaline with caustic soda solution, the basic ether separated as an oil. The oil was taken up in ether, the ethereal solution washed with water, dried over sodium sulfate and, after removal of the ether, the residue was distilled under reduced pressure. The pure β-dimethylaminoethyl ether of diethylaminoethyl benzilate was obtained, B. P. 168–170° C./0.3 mm.

Example 2

A solution of 30 g. of the dimethylaminoethyl ether of ethyl benzilate in 250 ccs. absolute alcohol was heated under reflux with a solution of 5.6 g. of sodium hydroxide in 6 ccs. water for 1 hour. The sodium salt of the dimethylaminoethyl ether of benzilic acid separated rapidly from the reaction mixture and was finally filtered off, washed with absolute alcohol and ether and dried. A suspension of 11.3 g. of this sodium salt in 55 ccs. of dry toluene was treated with an excess of freshly prepared β-chloroethyldimethylamine (about 2 moles) and heated under reflux with stirring for 3 hours. A further similar excess of β-chloroethyldimethylamine was added and heating under reflux continued for a further two hours. The solid was filtered off and the filtrate worked up as described in the previous example yielding the β-dimethylaminoethyl ether of β-dimethylaminoethyl benzilate as an oil of boiling point 188–190° C./0.7 mm.

Example 3

A similar toluene suspension of the sodium salt described in Example 2 was heated under reflux with stirring with a considerable excess of freshly prepared N-(β-chloroethyl)-piperidine, a total of about 4 molecular proportions being added over a period of about 4 hours. The solid was filtered off and the filtrate, on working up as already described, yielded β-dimethylaminoethyl ether of β-piperidinoethyl benzilate, an oil with B. P. 185° C./0.01 mm.

Example 4

A suspension of 25.6 g. of the previously described sodium salt in 128 ccs. of dry toluene was heated with stirring under reflux with one molecular proportion of freshly prepared β-chloroethyldiethylamine for 1 hour. A further half molecular proportion of β-chloroethyldiethylamine was added and heating continued for a further hour. The product was worked up as described above, yielding, as in Example 1, the β-dimethylaminoethyl ether of β-diethylaminoethyl benzilate.

We claim:

1. Derivatives of [β-dimethylaminoethoxy]-diphenylacetic acid of the formula

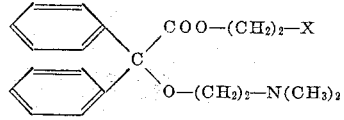

wherein X is selected from the group consisting of dimethylamino, diethylamino and piperidino radicals.

2. β-Dimethylaminoethyl [β-dimethylaminoethoxy]-diphenylacetate.

3. β-Diethylaminoethyl [β-dimethylaminoethoxy]-diphenylacetate.

4. β-N-Piperidinoethyl [β-dimethylaminoethoxy]-diphenylacetate.

5. Process for the manufacture of derivatives of [β-dimethylaminoethoxy]-diphenylacetic acid of the formula

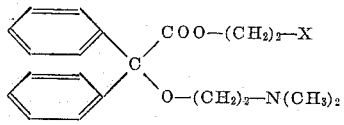

wherein X is selected from the group consisting of dimethylamino, diethylamino and piperidino radicals, comprising reacting an alkali metal salt of [β-dimethylaminoethoxy]-diphenylacetic acid with a compound selected from the group consisting of β-dimethylamino-α-chloroethane, β-diethylamino-α-chloroethane and β-N-piperidino-α-chloroethane.

6. Process for the manufacture of β-dimethylaminoethyl [β-dimethylaminoethoxy]-diphenylacetate, comprising reacting the sodium salt of [β-dimethylaminoethyoxy]-diphenylacetic acid with β-dimethylamino-α-chloroethane.

7. Process for the manufacture of β-dimethylaminoethyl [β-dimethylaminoethoxy]-diphenylacetate, comprising reacting the sodium salt of [β-dimethylaminoethoxy]-diphenylacetic acid with β-diethylamino-α-chloroethane.

8. Process for the manufacture of β-N-piperidinoethyl [β-dimethylaminoethoxy]-diphenylacetate, comprising reacting the sodium salt of [β-dimethylaminoethoxy]-diphenylacetic acid with β-N-piperidino-α-chloroethane.

ALEXANDER LANG MORRISON.
MARIANNE KÖNIGSTEIN.

REFERENCES CITED

The following references are of record in the file of this patent:

UNITED STATES PATENTS

| Number | Name | Date |
| --- | --- | --- |
| 1,987,546 | Blankart | Jan. 8, 1935 |
| 2,394,770 | Hill et al. | Feb. 12, 1946 |

FOREIGN PATENTS

| Number | Country | Date |
| --- | --- | --- |
| 185,361 | Switzerland | Oct. 1, 1946 |

OTHER REFERENCES

Burtner et al., "Journal of the American Chem. Soc.," vol. 65, pages 262–267 (1943).